(12) United States Patent
Discant

(10) Patent No.: US 9,393,628 B1
(45) Date of Patent: Jul. 19, 2016

(54) POWER TOOL ASSEMBLIES, POWER TOOL SUPPORTS, AND METHODS FOR USING POWER TOOLS

(71) Applicant: GAP Investments, LLC, Spokane, WA (US)

(72) Inventor: James Discant, Spokane, WA (US)

(73) Assignee: GAP Investments, LLC, Spokane, WA (US)

( * ) Notice: Subject to any disclaimer, the term of this patent is extended or adjusted under 35 U.S.C. 154(b) by 269 days.

(21) Appl. No.: 14/054,596

(22) Filed: Oct. 15, 2013

(51) Int. Cl.
  *B27C 5/10* (2006.01)
  *B23B 47/00* (2006.01)
  *B23C 1/20* (2006.01)

(52) U.S. Cl.
  CPC . *B23B 47/00* (2013.01); *B23C 1/20* (2013.01); *B27C 5/10* (2013.01); *Y10T 409/306608* (2015.01); *Y10T 409/308624* (2015.01)

(58) Field of Classification Search
  CPC .. B23C 1/20; B27C 5/10; Y10T 409/306384; Y10T 409/306496; Y10T 409/306608; B23B 47/00; B23Q 9/0007
  USPC ............................. 409/178, 180, 182; 408/84
  See application file for complete search history.

(56) References Cited

U.S. PATENT DOCUMENTS

| | | | | |
|---|---|---|---|---|
| 1,160,267 A | * | 11/1915 | Davis | B23B 47/28 408/72 R |
| 1,398,419 A | * | 11/1921 | Connor | B25H 1/0078 408/112 |
| 1,479,325 A | | 1/1924 | Schubnel | |
| 1,830,404 A | * | 11/1931 | Moulton | D06H 1/003 101/26 |
| 2,255,541 A | | 9/1941 | Dremel | |
| 3,581,787 A | * | 6/1971 | Bane | B27C 5/10 144/136.95 |
| 3,640,635 A | | 2/1972 | Von Hollen | |
| 3,902,042 A | * | 8/1975 | Goldfarb | B26F 3/12 144/154.5 |
| 4,143,691 A | * | 3/1979 | Robinson | B27C 5/10 144/136.95 |
| 4,156,990 A | * | 6/1979 | Rutkowski | B24B 23/02 144/136.95 |
| 4,316,685 A | * | 2/1982 | George | B23C 1/20 144/136.95 |
| 5,368,424 A | * | 11/1994 | Bettenhausen | B23Q 17/24 144/136.95 |
| 5,743,683 A | * | 4/1998 | Skaggs | B21J 15/50 408/112 |
| 5,829,931 A | | 11/1998 | Doumani | |
| 6,244,796 B1 | | 6/2001 | Schuebel et al. | |
| D491,784 S | | 6/2004 | Chiang | |
| 7,131,898 B2 | | 11/2006 | Adkins et al. | |
| 7,410,333 B2 | | 8/2008 | Henzler | |
| 7,451,791 B2 | * | 11/2008 | Cooper | B25F 5/02 144/136.95 |
| 8,322,953 B2 | | 12/2012 | Spitznagel | |
| 8,393,835 B2 | | 3/2013 | Wasielewski | |
| 2003/0155141 A1 | | 8/2003 | Maras | |
| 2006/0157155 A1 | | 7/2006 | Robinson | |
| 2007/0147970 A1 | | 6/2007 | Henzler | |

FOREIGN PATENT DOCUMENTS

GB                356942 A  *  9/1931  .............. B23B 47/28

* cited by examiner

*Primary Examiner* — Sunil K Singh
*Assistant Examiner* — Alan Snyder
(74) *Attorney, Agent, or Firm* — Wells St. John P.S.

(57) ABSTRACT

A power tool support is provided that can include: a hollow body extending between two ends; at least one pedestal extending from one of the two ends of the hollow body; and a base coupled to the one pedestal. A power tool assembly is provided that can include: a support having a hollow body; and a cutting tool of a power tool extending at least partially through the body. A method for using a power tool is provided that can include: providing a rotating cutting power tool; with a support, aligning the cutting tool in a substantially normal relation to a material to be cut; grasping the support about both a body and at least one pedestal of the support; and guiding a base of the support about the material.

4 Claims, 7 Drawing Sheets

POWER TOOL ASSEMBLIES, POWER TOOL SUPPORTS, AND METHODS FOR USING POWER TOOLS

TECHNICAL FIELD

The present disclosure relates to power tool assemblies, power tool supports, and methods for using power tools. In specific implementations, the present disclosure relates to the guiding of power cutting tools such as routers and the like.

BACKGROUND

Power cutting tools are available to the craftsman in many forms. These power cutting tools can range from drills, routers, and/or other bladed power tools. Associated with the use of these tools is the cutting of fine designs on substrates such as wood, metal, and/or plastic. These fine designs can be made difficult with the arrangement of the cutting tool in relation to the material to be cut, or the substrate to be cut. The present disclosure provides power tool assemblies, power tool supports, and methods for using power tools.

SUMMARY OF THE DISCLOSURE

A power tool support is provided that can include: a hollow body extending between two ends; at least one pedestal extending from one of the two ends of the hollow body; and a base coupled to the one pedestal.

A power tool assembly is provided that can include: a support having a hollow body; and a cutting tool of a power tool extending at least partially through the body.

A method for using a power tool is provided that can include: providing a rotating cutting power tool; with a support, aligning the cutting tool in a substantially normal relation to a material to be cut; grasping the support about both a body and at least one pedestal of the support; and guiding a base of the support about the material.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
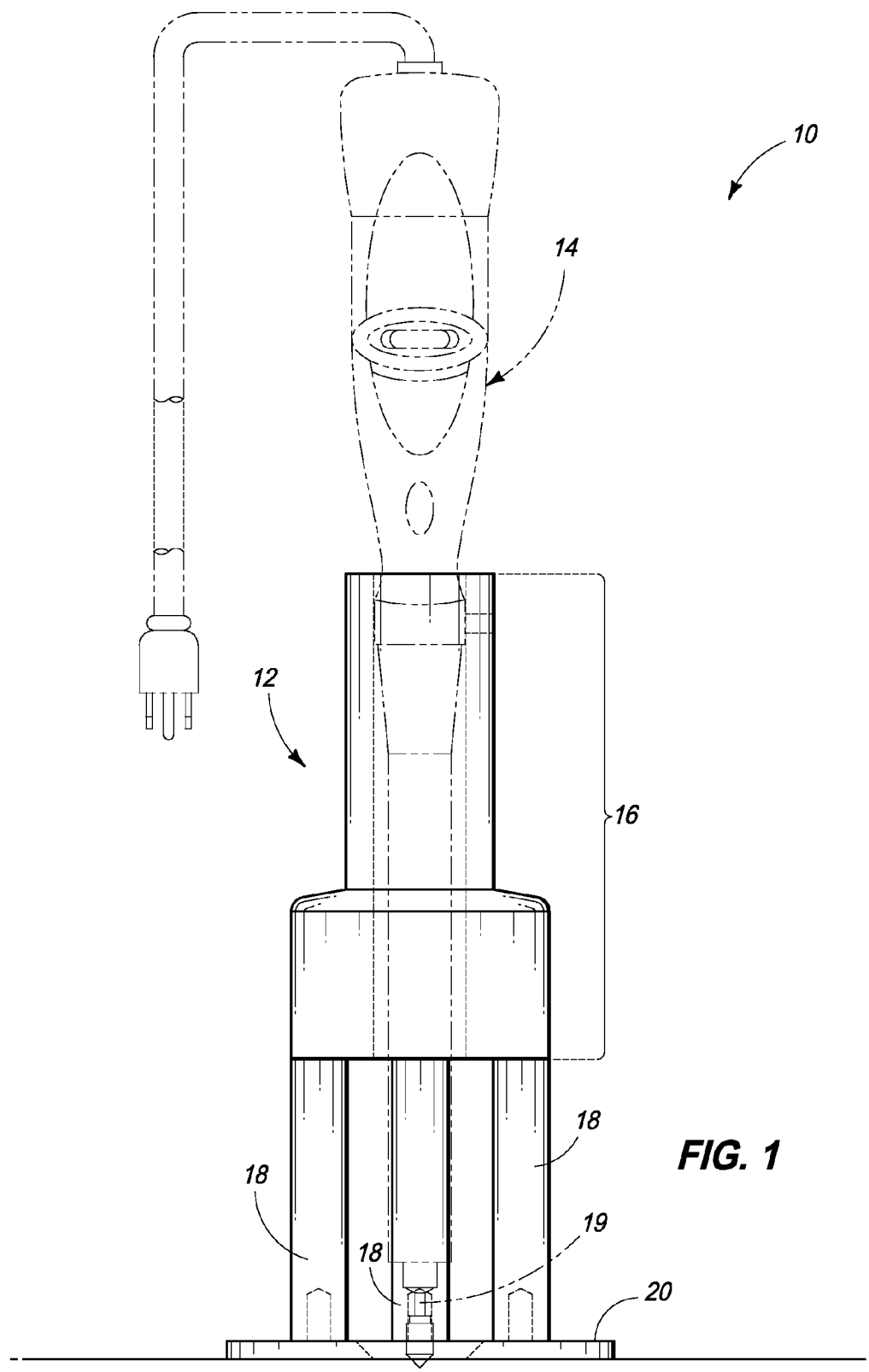
FIG. 1 is a power tool assembly according to an embodiment of the disclosure.

The power tool assemblies, power tool supports, and methods for using power tools will now be described with reference to FIGS. 1-9. Referring first to FIG. 1, a power tool assembly 10 is show that includes a support 12 coupled to a power tool 14. Support 12 can have a hollow body 16 and a cutting tool 19. Cutting tool 19 can extend at least partially through body 16. Support 12 can have at least one pedestal 18 and a base 20 between pedestal 18 and body 16.

Figure 2:
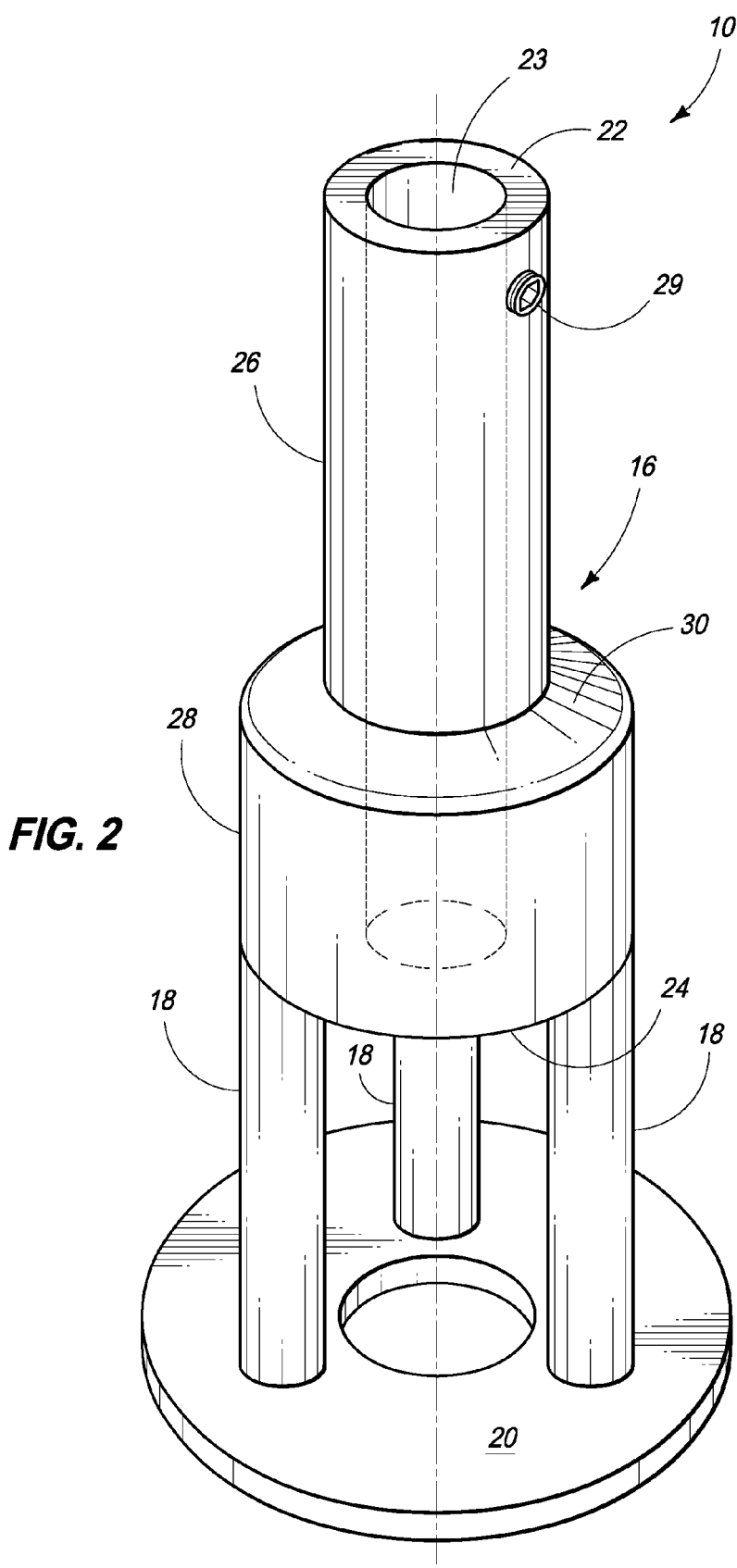
FIG. 2 is a power tool support according to an embodiment of the disclosure.

Referring next to FIG. 2, body 16 can extend between end 22 and end 24. These two ends can define the relative terminuses of body 16. Body 16 can define an opening 23 that can extend the length of body 16, thereby creating a hollow body 16. Body 16 can have at least two portions, portion 26 and portion 28. According to example implementations, portion 26 can have a first outside diameter in one cross section, and portion 28 can have a second outside diameter in the same cross section. The first diameter can be less than the second diameter. According to example implementations, the opening 23 can be approximately ⅝". The body and pedestal can be comprised of aluminum, for example, but other materials may be utilized. Body 16 may include a taper or shoulder 30, between portion 26 and portion 28. Support can include at least one pedestal 18, but many pedestals may be utilized, such as a plurality or even three pedestals as shown. In accordance with example implementations, these pedestals may be ⅜" in diameter in one cross section. Pedestals 18 may extend from an end of portion 28, for example. In accordance with example implementations, the pedestals 18 may be aligned with the outside diameter of portion 28. In accordance with example implementations, base 20 may define a third outside diameter in one cross section, with this third outside diameter being greater than the second outside diameter defined by portion 28 as well as the first outside diameter defined by portion 26.

Figure 3:
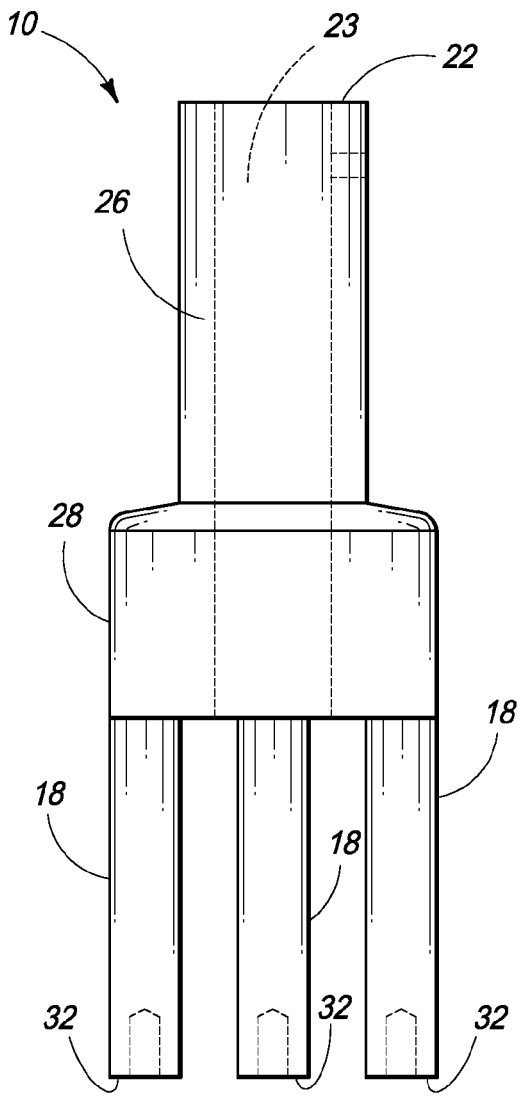
FIG. 3 is a portion of a power tool support according to an embodiment of the disclosure.
Figure 4:
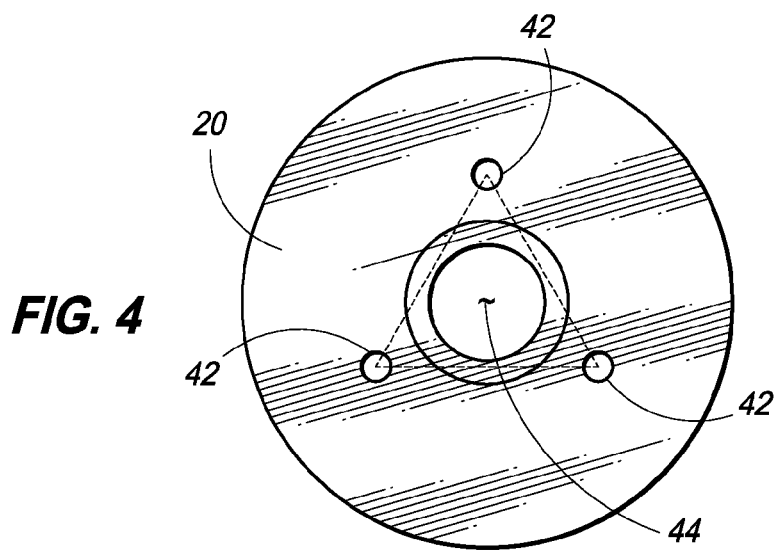
FIG. 4 is a base of a power tool support according to an embodiment of the disclosure.

Referring to FIGS. 3 and 4, subassemblies of support 12 are shown. In FIG. 3, pedestals 18 are shown in relation to portion 28 aligned with the outside diameter of portion 28, as well as terminus 32. Pedestals 18 are shown for coupling with base 20 at points shown in FIG. 4 as coupling points 42. In accordance with example implementations, pedestals 18 may be oriented in a triangular relation as shown in FIG. 4 and represented by a dashed line. Opening 44 within base 20 can be configured to receive a cutting tool as it extends into a substrate for cutting. This opening may be as great at ⅞", for example. Both the base and the opening may be substantially circular in one cross section. According to exemplary embodiments, base 20 may be completely transparent. A cutting tool extending through base 20 may be aligned in substantial parallel orientation with pedestals 18, for example.

Figure 5:
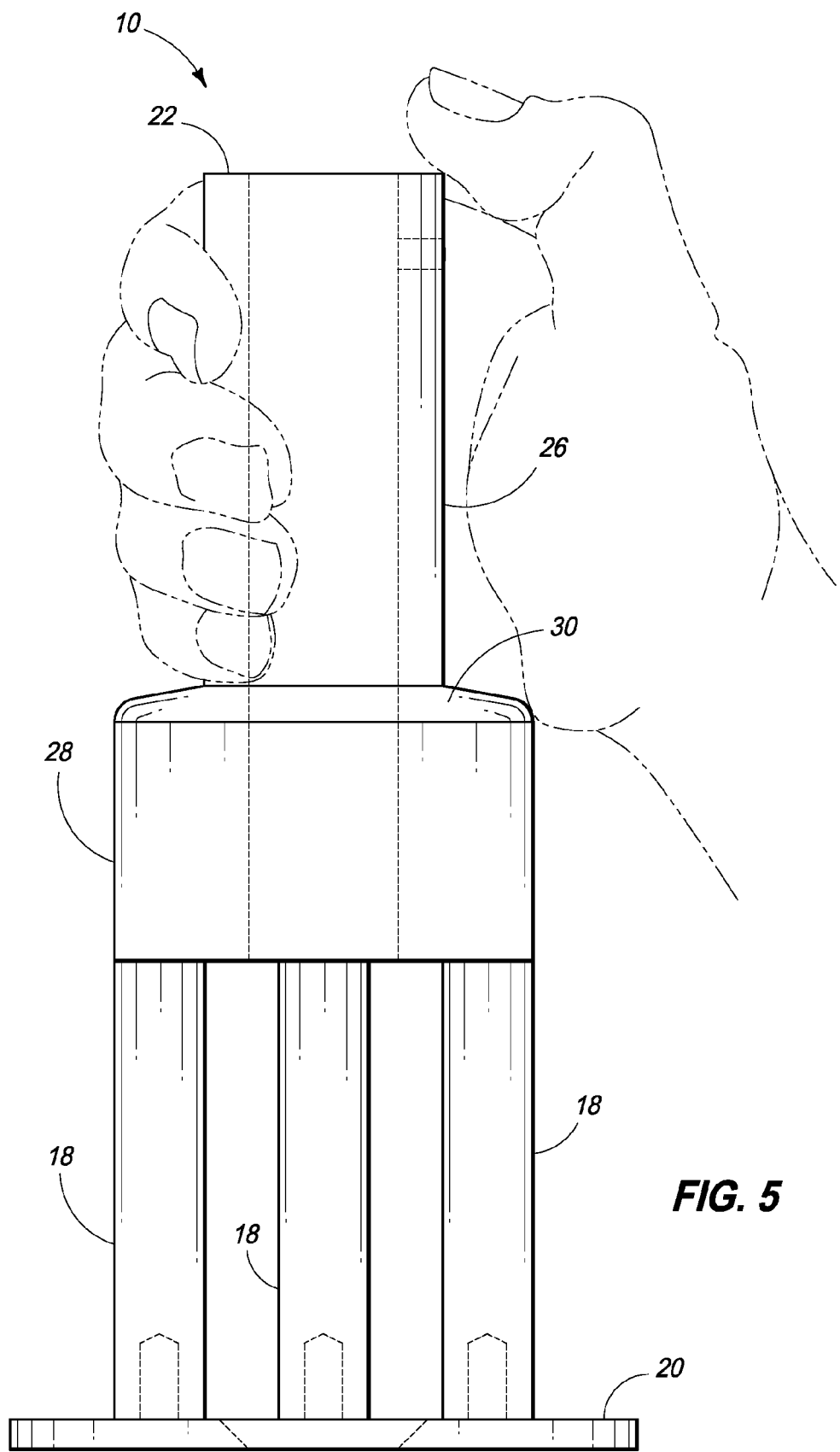
FIG. 5 is a representation of the power tool assembly in use according to an embodiment of the disclosure.
Figure 6:
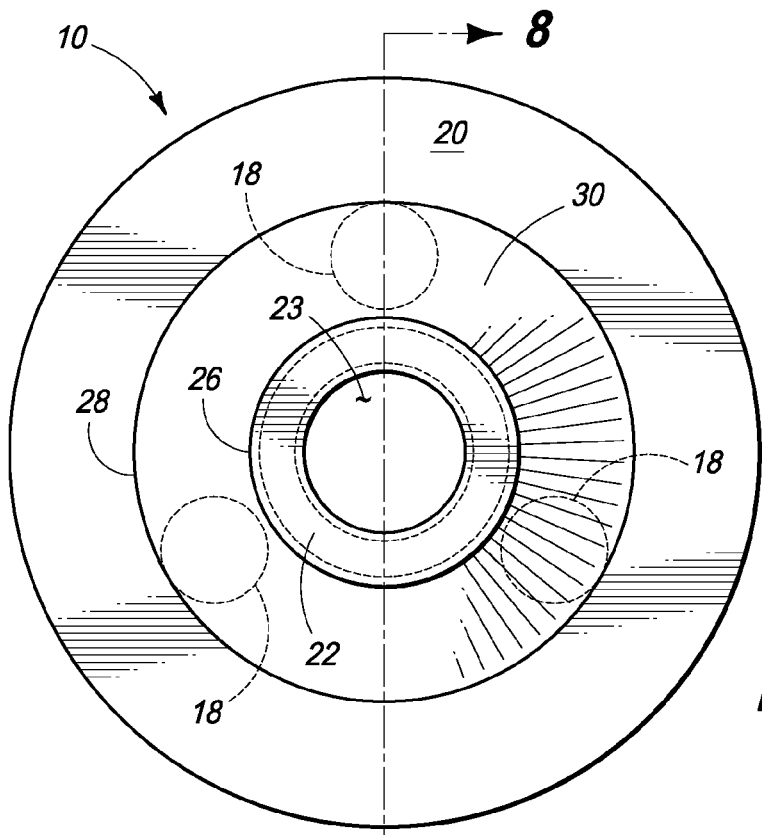
FIGS. 6-7 are additional views of the power tool support according to an embodiment of the disclosure.
Figure 7:
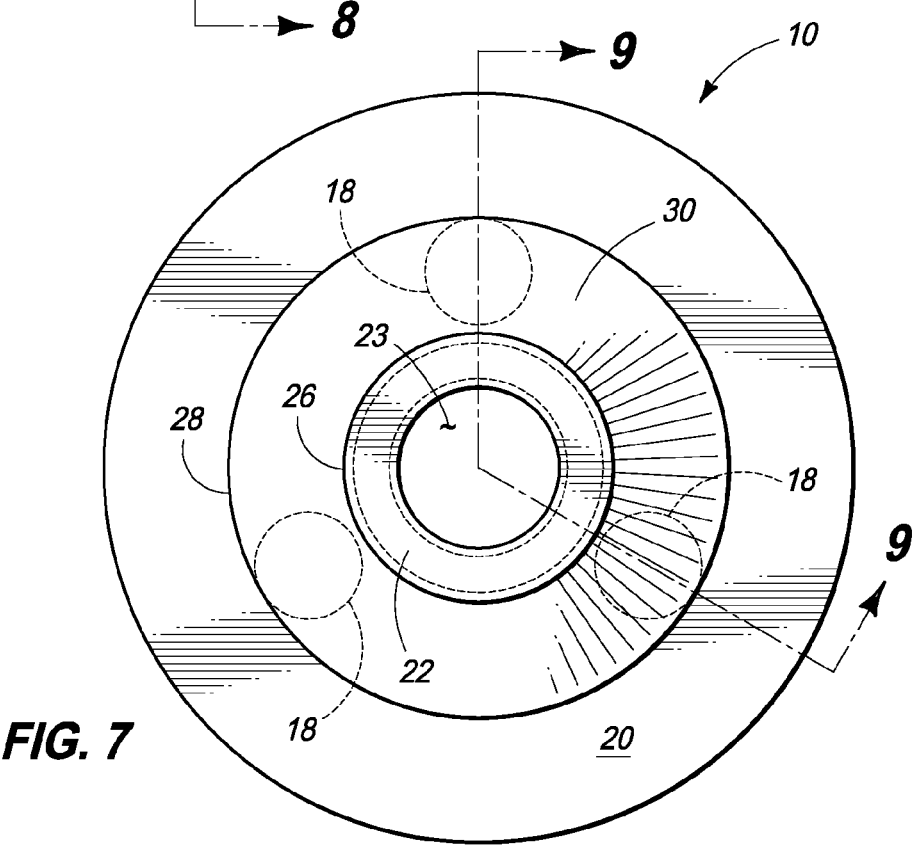
Figure 8:
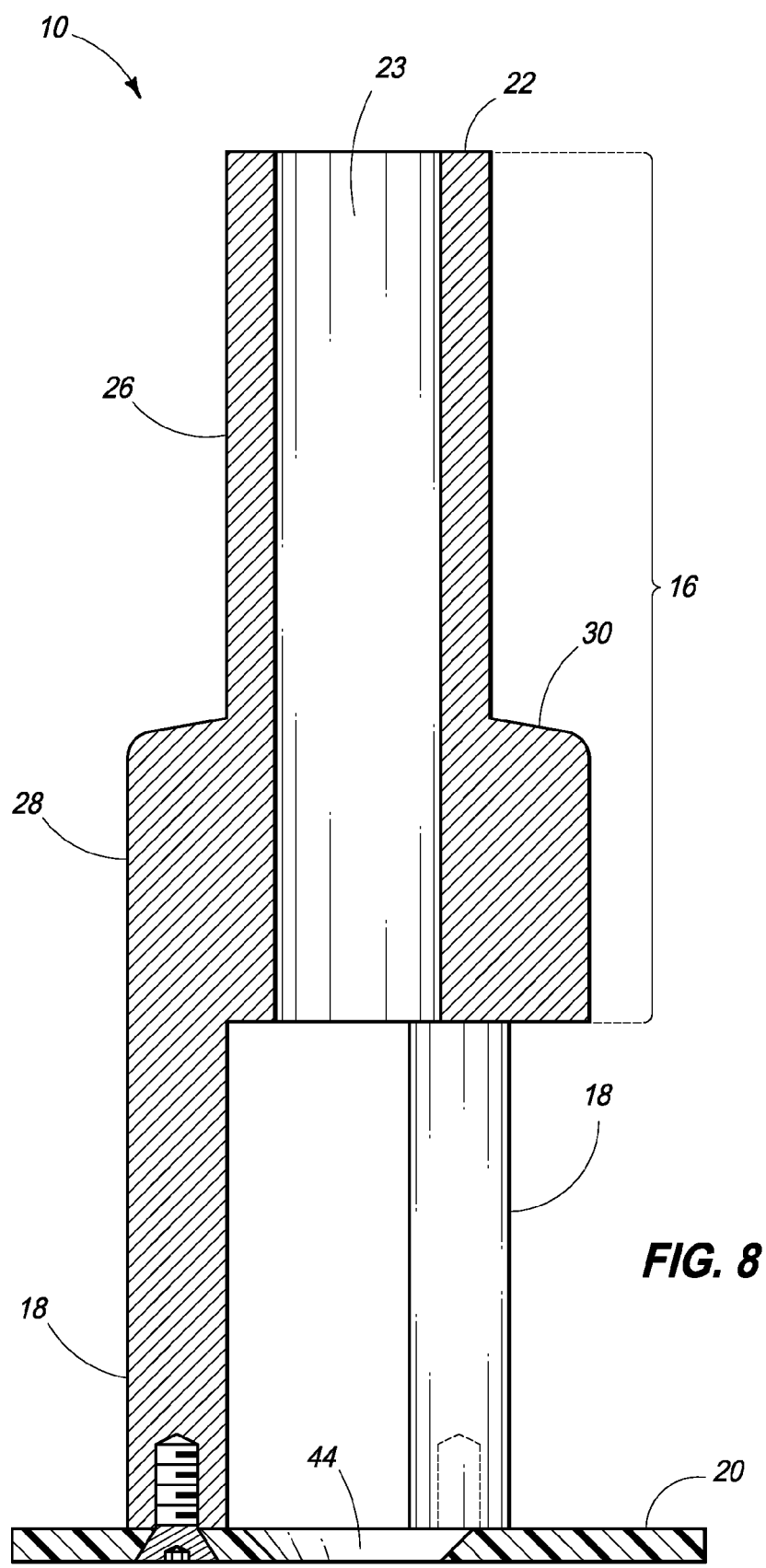
FIG. 8 is a sectional view of the power tool support according an embodiment of the disclosure.
Figure 9:
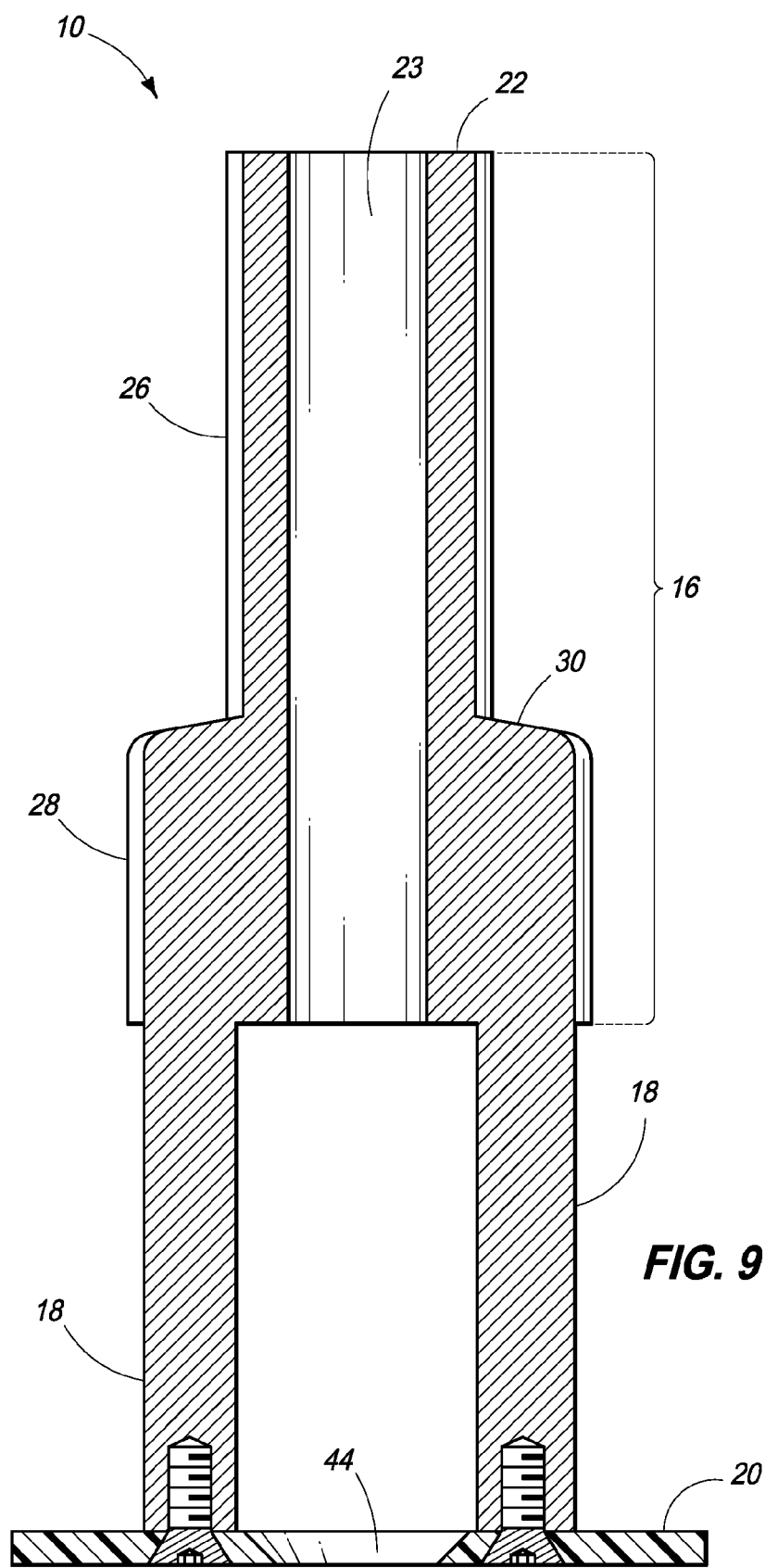
FIG. 9 is another sectional view of the power tool support according an embodiment of the disclosure.

Referring to FIG. 5, as can be seen, a hand is grasping assembly 10. According to example implementations, methods for utilizing a power tool can include providing a rotating cutting power tool, such as described, and then within support 12, aligning the cutting tool in substantially normal relation to the material to be cut. The method can include grasping the support with both hands, by both the body and at least one pedestal of the support, and guiding the base of the support about the material. Methods can include releasably coupling a power tool to the support via releasably coupling tool 29, such as a set screw that can include a 3/16" slot screw. Methods can also include extending the rotating cutting tool along the pedestals and through an opening within the base and viewing the cutting material through the base while using the assembly.

Referring to FIGS. 6-9, views of support 12 are shown that include a sectional views.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A single detachable hand guided power tool support comprising:
- a hollow body extending between two ends, the hollow body comprising a first portion having a first outside diameter in one cross section and a second portion having a second outside diameter in the one cross section, the first portion being configured to be grasped by a single hand when desirable, the first diameter being less than the second diameter, the hollow body configured to receive a power tool;
- a shoulder section between the first and second portions of the hollow body;
- at least three individual pedestals extending from the second portion of the hollow body, each pedestal having a threaded hole at its terminus; and
- a circular transparent base coupled to the at least three pedestals by fasteners passing through coupling points in the base, and engaging the threaded holes, the pedestals and base being configured to be grasped by a single hand when desirable.

2. The power tool support of claim 1 wherein the shoulder portion comprises a taper extending between the first and second portions of the hollow body.

3. The power tool support of claim 1 wherein the base defines a third outside diameter in the one cross section, the third outside diameter being greater than the second outside diameter.

4. The power tool support of claim 1 wherein the pedestals are arranged in triangular relation to one another.

* * * * *